United States Patent Office

3,530,200
Patented Sept. 22, 1970

3,530,200
ETHYLENE OLIGOMERIZATION
Peter W. Glockner, Alameda, Calif., assignor to Shell Oil Company, New York, N.Y., a corporation of Delaware
No Drawing. Continuation-in-part of application Ser. No. 738,802, June 21, 1968. This application Jan. 13, 1969, Ser. No. 790,839
Int. Cl. C07c 3/18
U.S. Cl. 260—683.15    11 Claims

ABSTRACT OF THE DISCLOSURE

An improved ethylene oligomerization process employs a catalyst composition produced by contacting (1) a sulfided cobalt or nickel compound on an alumina refractory metal oxide support and (2) an alkyl aluminum compound.

CROSS-REFERENCE TO RELATED APPLICATION

This application is a continuation-in-part of copending U.S. application Ser. No. 738,802, filed June 21, 1968, and now abandoned.

BACKGROUND OF THE DISCLOSURE

A variety of oligomerization catalysts, both homogeneous and heterogeneous, have been utilized to convert, i.e., oligomerize, ethylene into olefinic products of higher molecular weight, e.g., to dimer, trimer tetramer or the like. However, the character and relative proportions of the product mixture components are greatly dependent upon the particular catalyst employed. One heterogeneous process is that disclosed by U.S. 3,271,474 of Engelbrecht et al., issued Sept. 6, 1966, which employs a cobalt oxide supported on activated carbon as catalyst composition to produce a product mixture essentially comprising dimer product and a small proportion of olefinic products of higher molecular weight. A related process, disclosed in Netherlands patent applications 6609512 and 6609513 employs a catalyst composition prepared by reducing a cobalt salt with an organo-aluminum compound. Similar to the catalyst composition of U.S. 3,271,474, this composition also produces essentially only olefin dimer product. It would be of advantage, however, to obtain a product mixture having a relatively high proportion of olefin products in the higher molecular range, which products are advantageously highly linear in character.

SUMMARY OF THE INVENTION

It has now been found that an improved process of oligomerizing ethylene is obtained through the use of a heterogeneous catalyst composition produced by contacting (1) a sulfided cobalt or nickel salt adsorbed on an alumina-containing solid support and (2) an alkyl aluminum compound. The process is characterized by ethylene conversion to a product mixture of relatively high proportions of olefinic products in the higher molecular weight range, e.g., trimer, tetramer and higher oligomers, which are highly linear in character and predominately alpha-olefins.

DESCRIPTION OF PREFERRED EMBODIMENT

The process of the invention contemplates, broadly speaking, intimately contacting ethylene in a liquid reaction environment with a catalyst composition produced by contacting a sulfided cobalt or nickel salt on an alumina-containing support and an alkyl aluminum compound.

In general, any anhydrous cobalt or nickel salt can be employed for preparing the catalyst composition of the invention provided the salt can be supported on the catalyst carrier in a substantially anhydrous liquid medium. For example, anhydrous cobalt or nickel salts which have substantial solubility in an inert polar organic solvent are generally satisfactory. In most instances, a cobalt or nickel salt with a solubility in inert polar solvents of at least 0.2 gram of salt per 100 grams of inert solvent is satisfactory although a solubility of at least 0.5 gram of salt on the same basis is preferred. Inert polar organic solvents suitably employed for impregnation of the salt on the catalyst support are defined below. In part because of their availability cobalt and nickel halides of halogen of atomic number from 9 to 53 inclusive are preferred catalyst precursors.

In order to obtain a high proportion of linear terminal olefinic oligomers in the higher molecular range, it is essential to pretreat the anhydrous, crystalline metal salt employed for preparing the catalyst composition with sulfur or a sulfur-containing compound. Although it is not known with certainty, it is considered likely that the sulfur-component serves to produce a sulfided cobalt or nickel salt, e.g., a cobalt salt containing cobalt-sulfur bonds. The pretreatment of the cobalt or nickel salt, however, can be conducted by any more or less conventional method provided the cobalt salt is contacted with sufficient sulfur or sulfur-containing compound to incorporate from about 0.01% to about 5% by weight based on cobalt of sulfur, preferably 0.1% to about 3% by weight on the same basis within the cobalt salt and the nickel salt is contacted with sufficient sulfur or sulfur-containing compound to incorporate from about 0.01% to about 30% by weight based on nickel salt of sulfur, preferably 0.1% to about 20% by weight on the same basis within the nickel salt.

In general, any sulfur-containing compound, in addition to sulfur, can be employed as the sulfiding agent provided that the non-sulfur portion of the compound is substantially inert to the catalyst support.

One class of suitable sulfur-containing compounds is those which contain only the atoms of hydrogen and carbon in addition to atoms of sulfur, e.g., hydrogen sulfide and hydrocarbyl sulfur compounds. Suitable hydrocarbyl sulfur compounds include olefin episulfides, dialkyl sulfides and dialkyl disulfides of up to 10 carbon atoms. Illustrative olefin episulfides are alkenyl episulfides such as propylene episulfide, 2-butene episulfide, 1-hexane episulfide, 3-octane episulfide and cycloalkene episulfides such as cyclopentene episulfide, cyclohexene episulfide and cyclodecene episulfide. Illustrative dialkyl sulfides are dimethyl sulfide, methyl ethyl sulfide, diethyl sulfide, ethyl butyl sulfide and dibutyl sulfide. Illustrative dialkyl disulfides are dimethyl disulfide, propyl butyl disulfide and ethyl octyl sulfide.

Other suitable hydrocarbyl sulfur compounds are alkyl alkenyl sulfides of up to 10 carbon atoms, e.g., methyl allyl sulfide, ethyl allyl sulfide and methyl 2-butene sulfide; aliphatic mercaptans of up to 10 carbon atoms, e.g., ethyl mercaptan, propyl mercaptan and cyclohexyl mercaptan; alkyl dithiocarboxylic acids, e.g., thionothiolactic acid, thionothiolpropionic acid and thionothiobutyric acid; and aliphatic thioketones, e.g., 2-propanethione, 2-butanethione, 2-hexanethione, 2,4-pentanedithione and cyclohexanethione.

The use of hydrocarbyl sulfur compounds, such as hydrocarbon sulfides, for incorporating sulfur on metal compounds is known in the art and is disclosed, for example, by P. M. Treichel et al., Inorg. Chem. 5, 1182 (1966).

Another class of sulfur-containing compounds are inorganic sulfur compounds such as sulfur halides and thionyl halides. Illustrative sulfur halides are sulfur monochloride, sulfur dichloride, sulfur monobromide and sulfur dibromide; and illustrative thionyl halides are thionyl chloride and thionyl bromide. With thionyl halides as sulfiding agents, a hydrated metal salt is conveniently sulfided as well as rendered anhydrous, e.g., contacting of $CoCl_2 \cdot 6H_2O$ with excess thionyl chloride produces an anhydrous sulfided cobalt salt suitable for preparing the catalyst composition of the invention.

Preferred sulfiding agents are aliphatic sulfur compounds containing a high proportion of sulfur, particulary lower (up to 4 carbon atoms) olefin episulfides, dialkyl sulfides and dialkyl disulfides.

The catalyst support comprises a substantially silica-free solid inorganic metal oxide support containing a major proportion of alumina. Such materials are known as refractory metal oxides containing a major proportion of alumina and include, for example, alumina, magnesia-alumina, tungsten oxide-alumina, zirconia-alumina, molybdenum oxide-alumina, and alumina-titania-zirconia. Preferred silica-free refractory metal oxide supports contain at least 75% by weight of alumina, more preferably at least 90% by weight alumina.

No special pretreatment of the catalyst support prior to preparation of the catalyst composition is required, but better results are obtained if the support has been calcined at temperatures from about 450° C. to about 600° C. for a period of from about 6 to about 24 hours prior to contact with the remaining catalyst components.

As previously indicated, a variety of more or less conventional techniques may be employed to prepare the supported cobalt or nickel salt. In one modification, the cobalt or nickel salt is sulfided prior to contacting with the catalyst support. In this modification, the sulfiding of the metal salt is conducted in an inert diluent at a temperature of about 0° C. to about 200° C. and at a pressure of from about 1 atmosphere to about 20 atmosphere.

Illustrative of suitable inert diluents are hydrocarbons free from aliphatic unsaturation such as hexane, octane, decane, dodecane, cyclohexane, decahydronaphthalene, benzene, toluene and xylene. Subsequent to the contacting of the metal salt and the sulfiding agent, the resulting sulfided metal salt is separated from the diluent phase by conventional techniques, such as filtration, decantation or evaporation.

In another modification, the unsulfided cobalt or nickel salt is supported on the catalyst support prior to contact with the sulfiding agent. In this modification, subsequent to the impregnation of the catalyst support with metal salt, the supported metal salt is sulfided by a procedure similar to the sulfiding of the unsupported metal salt, e.g., by contacting the sulfiding agent and supported metal salt in an inert diluent at a temperature of about 0° C. to about 200° C. and at a pressure of 1 atmosphere to about 20 atmospheres. This modification is preferred for preparing sulfided, supported nickel salts.

Although other conventional contacting techniques are on occasion useful, the preferred method of contacting the catalyst support and the metal salt is to intimately contact the support with a solution of the sulfided or unsulfided metal salt in a liquid polar organic solvent which preferably is free from active hydrogen atoms and aliphatic carbon-carbon unsaturation, i.e., non-aromatic carbon-carbon unsaturation. Illustrative of such solvents are oxygenated hydrocarbons containing only atoms of carbon and hydrogen besides from 1 to 3 oxygen atoms. Suitable solvents are oxygenated hydrocarbons of up to 10 carbon atoms, preferably of up to 6 carbon atoms, such as dialkyl ketones, e.g., acetone, methyl ethyl ketone and ethyl butyl ketone; cycloalkyl ethers, e.g., dioxane, tetrahydrofuran, and tetrahydropyran; and acyclic alkyl ethers, e.g., dimethoxyethane, diethylene glycol dimethyl ether and dibutyl ether. Other suitable polar organic solvents include nitriles such as acetonitrile, dialkylamides such as dimethylformamide, and dialkylsulfoxides such as dimethylsulfoxide. Preferred polar solvents comprise dialkyl ketones and monocylcoalkyl ethers, especially acetone and tetrahydrofuran. Although the amounts of polar solvent employed depend in part upon the solubility of the metal salt, amounts of solvent up to 100 times the weight of catalyst support are typically employed.

The sulfided metal compound and catalyst support are contacted at any convenient temperature with the range from about 20° C. to about 150° C. being satisfactory. The pressure to be employed is not critical. In general, pressures from about 1 atmosphere to about 50 atmospheres are satisfactory although substantially atmospheric pressures are preferred.

The amount of metal compound to be added to the catalyst support is not critical so long as sufficient cobalt is introduced onto the support to allow adequate ethylene/catalyst contact during the ethylene oligomerization process in which the catalyst composition is employed. In general, catalyst support containing from about 0.1% by weight to about 5% by weight based on catalyst support of metal compound are satisfactory with amounts from about 0.5% to about 3% by weight on the same basis being preferred.

Subsequent to the contacting of the catalyst support and the metal compound, the resulting supported metal composition is separated from the solvent phase by conventional techniques, such as filtration and decantation.

In order to obtain the active catalyst composition of the invention, the sulfided, supported metal composition is treated with an alkyl aluminum compound. Although alkyl aluminum compounds such as alkyl aluminum alkoxides, e.g., alkylaluminum dialkoxides and dialkylaluminum alkoxides, are in part operable, alkyl aluminum halides and trialkylaluminum compounds are preferred. Suitable alkyl aluminum compounds include alkylaluminum sesquihalides represented by formula I and alkyl aluminum halides and trialkylaluminum compounds representd by formula II:

(I)      (II)

wherein R is alkyl of up to 8 carbon atoms, preferably of up to 4, X is halogen, preferably halogen of atomic number from 17 to 35 inclusive, i.e., the middle halogens chlorine and bromine, and $n$ is a whole number from 1 to 3 inclusive. Illustrative to alkylaluminum sesquihalides of Formula I are triethylaluminum sesquichloride and triethylaluminum sesquibromide. Illustrative of alkyl aluminum compounds of Formula II are alkylaluminum dihalides such as ethylaluminum dichloride, ethylaluminum dibromide, propylaluminum dicloride and butylaluminum dichloride; dialkylaluminum halides such as diethylaluminum chloride, dipropylalmuminum bromide, and dioctylaluminum chloride; and trialkylaluminum compounds such as triethylaluminum, tripropylaluminum, tributylaluminum and trioctylaluminum. In most applications, the particularly preferred class of alkyl aluminum compounds are alkyl aluminum halides represented by Formula II, wherein $n$ is 2, e.g., dialkylaluminum halides, especially diethylaluminum chloride.

The ratio of supported metal composition to alkyl aluminum compounds used to form the oligomerization catalyst will in part depend upon the type of alkyl aluminum compound employed. It will be understood that trialkylaluminum compounds can be considered as having three moles of alkylaluminum bond for each mole of aluminum, whereas dialkylaluminum halides supply two moles of alkyl-aluminum bond per mole of aluminum, alkylaluminum dihalides supply one mole of alkyl-aluminum bond per mole of aluminum, and alkylaluminum sesquihalides supply one and one-half moles of alkyl-aluminum bond per mole of aluminum. The quantity of the alkyl aluminum compound is selected so that the ratio of moles of alkyl-aluminum bond provided by the alkyl aluminum compound to moles of metal salt absorbed on the catalyst support is from about 2:1 to about 10:1, preferably from about 3:1 to about 6:1.

The alkyl aluminum compound is contacted with the sulfided, supported metal composition in the liquid phase in an inert reaction diluent which is liquid at reaction temperature and pressure. Illustrative of suitable reaction diluents are hydrocarbons free from aliphatic unsaturation such as hexane, decane, cyclohexane, decahydronaphthalene, benzene, and toluene. Preferred reaction diluents comprise the aliphatic saturated alkanes of from 6 to 12 carbon atoms.

The temperature at which the alkyl aluminum compound is contacted with supported metal composition depends in part upon the particular type of alkyl aluminum compound employed. Although contact temperature of from about −15° C. to about 50° C. are in general satisfactory, the more reactive trialkylaluminum compounds and alkyl aluminum sesquihalides are preferably contacted with the supported cobaltous compositions at a lower temperature, e.g., from about −15° C. to about 0° C. The pressure to be employed is not critical, e.g., pressures of from about 1 atmosphere to about 50 atmospheres are satisfactory.

Subsequent to the contacting of the sulfided, supported metal composition and the aluminum compound, the resulting oligomerization catalyst composition is separated from the diluent, if desired, by conventional techniques such as filtration and decantation. In most instances, however, it is more convenient to directly employ the mixture of diluent and catalyst composition in the ethylene oligomerization process wherein the presence of a reaction diluent is also desired.

The amount of oligomerization catalyst composition employed in the oligomerization process is not critical. Generally, amounts of oligomerization catalyst composition from about 1% by weight to about 200% by weight based on ethylene are satisfactory with amounts from about 10% by weight to about 100% by weight on the same basis being preferred.

The ethylene oligomerization process is conducted by contacting, in non-gaseous phase, the ethylene, the catalyst composition and a reaction diluent which is the same as or similar to the diluent utilized in the production of the catalyst composition. In certain modifications of the process, a portion of the oligomer product suitably serves as at least a portion of the reaction diluent and less added diluent is required. In most instances, however, added diluent is used and amounts up to about 5 moles of diluent per mole of ethylene are satisfactory. The ethylene oligomerization is conducted in an inert reaction environment so that the reaction conditions are substantially anhydrous and substantially oxygen-free.

The precise method of establishing ethylene/catalyst contact is not critical. In one modification, the catalyst composition and the diluent are charged to an autoclave or similar pressure reactor, the ethylene feed is introduced, and the reaction mixture is maintained with agitation at reaction temperature and pressure for the desired reaction period. Another modification comprises passing, in a continuous manner, the ethylene feed in liquid-phase solution in the reaction diluent through a reaction zone in which the catalyst composition is maintained. By any modification, the oligomerization process is conducted at moderate temperatures and pressures. Suitable reaction temperatures vary from about 20° C. to about 200° C., but preferably from about 20° C. to about 100° C. The reaction is conducted at or above atmospheric pressure. The precise pressure is not critical, so long as the reaction mixture is maintained substantially in a non-gaseous phase. Typical pressures vary from about 1 atmosphere to about 80 atmospheres with the range from about 2 atmospheres to about 35 atmospheres being preferred.

At the conclusion of reaction, the product mixture is separated and the oligomer products are recovered by conventional methods such as fractional distillation, selective extraction, adsorption and the like. The reaction diluent, the catalyst composition and any unreacted ethylene feed are recycled for further utilization.

The ethylene oligomer products are materials of established utility and many are chemicals of commerce. The oligomer products, which remain ethylenic in character, are converted by conventional "Oxo" processes to aldehyde which are hydrogenated with conventional catalysts to the corresponding schools. Alternatively, the product olefins are converted to secondary and tertiary alcohols as by sulfuric acid-catalyzed hydration. The $C_{12}$–$C_{20}$ alcohols thereby produced are ethoxylated as by reaction with ethylene oxide in the presence of a basic catalyst, e.g., sodium hydroxide, to form conventional detergents and the lower molecular weight alcohols are esterified by reaction with polybasic acids, e.g., phthalic acid, to form plasticizers for polyvinyl chloride.

The linear $C_{10}$–$C_{20}$ alpha-olefin products of the process are particularly advantageously employed for conversion, e.g., as by treatment with sulfur-trioxide, to alpha-olefin sulfonates, which are useful as biodegradable detergents.

To further illustrate the improved process of the invention and the novel catalyst composition therefor, the following examples are provided. It should be understood that the details thereof are not to be regarded as limitations as they may be varied as will be understood by one skilled in this art.

Example I

A 10 g. sample of commercial anhydrous cobaltous chloride was stirred with 0.7 g. of cyclohexane episulfide in 25 ml. of toluene at a temperature of 25° C. for 1 hour. The cobaltous chloride was filtered, washed with n-heptane and dried under vacuum at a temperature of 25° C. Elemental analysis showed that the cobaltous chloride was sulfided with 0.43% by weight based on cobaltous chloride of sulfur.

By a procedure similar to that described above, a 10 g. sample of cobaltous chloride was treated with 10 g. of cyclohexenyl sulfide at a temperature of 25° C. for about 20 hours. The resulting cobaltous chloride was sulfided with 5.6% by weight of sulfur.

Example II

Comparative ethylene oligomerization experiments were conducted employing catalyst compositions prepared from the sulfur-containing cobaltous chloride samples prepared in Example I, and for comparison, a catalyst composition prepared from commercial cobaltous chloride. The catalyst compositions employed were prepared by contacting 50 ml. of a saturated tetrahydrofuran solution of the particular cobalt salt with 10 g. of commercial calcined alumina at a temperature of 25° C. The resulting alumina supported cobalt composition was separated from the tetrahydrofuran solution, washed with n-heptane and then contacted with 1 g. of diethylaluminum chloride in n-heptane. The resulting catalyst composition along with the n-heptane solvent was placed in a stirred autoclave. To the autoclave was charged 20 g. of ethylene. The autoclave was then maintained at a temperature of 25° C. The reaction conditions employed, the selectivity to various oligomers, and the percentage of straight-chain product are provided in Table I. The product distribution was determined by gas-liquid chromatography analysis of the olefin product and the percentage of straight-chain product was determined by gas-liquid chromatography analysis of the hydrogenated product mixture.

TABLE I

| | | | |
|---|---|---|---|
| Percent wt. S on $CoCl_2$ | 0 | 0.43 | 5.6 |
| Ethylene, g | 20 | 20 | 20 |
| Reaction time, hrs | 2.5 | 2.5 | 2.5 |
| Pressure, p.s.i.g | 400 | 400 | 400 |
| Ethylene conversion | 65 | 58 | 0 |
| Selectivity, percent wt.: | | | |
| $C_4$ | 95.5 | 67.5 | 0 |
| $C_6$ | 4.1 | 16.5 | 0 |
| $C_8$ | 0.4 | 5.8 | 0 |
| $C_{10}$ | 0 | 3.5 | 0 |
| $C_{12}$–$C_{20}$ | 0 | 6.7 | 0 |
| Straight-chain product, percent: | | | |
| $C_6$ | 50 | 91 | |
| $C_8$ | 30 | 94 | |
| $C_{10}$ | | 96 | |
| $C_{12}$–$C_{20}$ | | 98 | |

Example III

A 10 g. sample of commercial anhydrous cobaltous chloride was stirred with 5 g. of sulfur monochloride ($S_2Cl_2$) in carbon tetrachloride at a temperature of about 77° C. for 24 hours. The resulting sulfur-containing cobalt salt was filtered, washed with n-heptane and dried under vacuum at a temperature of 25° C. for 3 hours. Elemental analysis showed that 0.45% by weight based on the cobaltous chloride of sulfur was incorporated into the cobaltous chloride.

By a procedure identical to that employed above for sulfur monochloride, sulfur dichloride ($SCl_2$) was used to prepare a cobaltous chloride composition containing 0.06% by weight of sulfur.

Example IV

Catalyst compositions were prepared from the sulfur-containing cobalt salts prepared in Example III by contacting a saturated acetone solution of each cobalt salt with calcined alumina and treating the alumina supported cobalt salt with diethylaluminum chloride by a procedure similar to Example II. About one percent by weight based on alumina support of cobalt metal wase impregnated onto the support with each cobalt salt. The catalyst compositions were then employed for ethylene oligomerization by a procedure similar to that of Example II. The cobalt salt employed, the reaction conditions, the selectivity to various oligomers, and the percentage of straight-chain product are provided in Table II. The oligomeric products were predominantly alpha-olefins.

TABLE II

| Sulfur incorporating agent | $S_2Cl_2$ | $SCl_2$ |
|---|---|---|
| Percent wt. S on $CoCl_2$ | 0.45 | 0.06 |
| Amount catalyst composition, g | 10 | 10 |
| Ethylene, g | 20 | 20 |
| Pressure, p.s.i.g. | 400 | 400 |
| Reaction time, hours | 2.5 | 2.5 |
| Conversion, percent | 54 | 61 |
| Selectivity, percent wt.: | | |
| $C_4$ | 83.2 | 85.5 |
| $C_6$ | 8.5 | 7.3 |
| $C_8$ | 3.0 | 2.6 |
| $C_{10}$ | 1.8 | 1.5 |
| $C_{12}$ | 1.2 | 1.0 |
| $C_{14}$-$C_{20}$ | 2.3 | 2.1 |
| Straight-chain product, percent: | | |
| $C_4$ | 100 | 100 |
| $C_6$ | 88 | 90 |
| $C_8$ | 93 | 94 |
| $C_{10}$ | 94 | 96 |
| $C_{12}$ | 96 | 98 |
| $C_{14}$-$C_{20}$ | 98 | 98 |

Example V

A 238 g. sample of cobaltous chloride hexahydrate was stirred with 714 g. of thionyl chloride at a temperature of 25° C. for 3 hours and then heated on a steam bath for 15 hours. The resulting cobalt salt was filtered, washed with heptane and dried under vacuum (5 mm. of Hg) at a temperature of 100° C. for three hours. Elemental analysis showed that 1.4% by weight based on cobalt chloride of sulfur was incorporated onto the cobalt salt.

A saturated acetone solution of the sulfur-containing cobalt chloride was then contacted with calcined alumina to produce an alumina supported cobalt composition containing 1.4% by weight based on alumina support of cobalt metal by a procedure similar to that of Example II.

An oligomerization catalyst composition were then prepared from the alumina supported cobalt composition by treating 10 g. of the supported composition with 1 g. of diethylaluminum chloride in heptane solution at a temperature of 20° C. for 5 minutes. The resulting catalyst composition was employed for ethylene oligomerization by a procedure similar to Example II. The amounts of reaction components employed, the reaction conditions, and the selectivity to various oligomers, and the percentage of straight-chain product are provided in Table II.

TABLE II

| | |
|---|---|
| Catalyst, g. | 10 |
| Heptane solvent, g. | 41 |
| Ethylene solvent, g. | 15 |
| Temperature, ° C. | 25 |
| Pressure, p.s.i.g. | 300–400 |
| Reaction time, hours | 2.5 |
| Ethylene conversion, percent | 33 |
| Selectivity, percent | |
| $C_4$ | 53.5 |
| $C_6$ | 16.5 |
| $C_8$ | 10.6 |
| $C_{10}$ | 6.9 |
| $C_{12}$ | 5.3 |
| $C_{14}$ | 3.0 |
| $C_{16}$ | 2.0 |
| $C_{18}$ | 1.5 |
| $C_{20}$ | 0.8 |
| Straight-chain product, percent | |
| $C_4$ | 92 |
| $C_6$-$C_{20}$ | 98 |

Example VI

A 20 g. sample of activated carbon (Norit A) was successively washed with five 100 ml. portions of 1.6 N nitric acid at a temperature of 80° C. and then with 500 ml. of distilled water. The washed carbon was dried by heating at a temperature of 120° C. for 15 hours in air and at a temperature of 300° C. for 3 hours in a nitrogen atmosphere. The dried carbon was then stirred with a solution of 30 g. of cobaltous chloride hexahydrate in 20 ml. of water at a temperature of 25° C. for 30 minutes. After filtering and drying at 120° C. for 1 hour in air and at 300° C. for 30 minutes in a nitrogen atmosphere, the resulting cobalt-carbon composition was found by elemental analysis to contain 17.9% by weight of cobalt.

A 11.7 g. sample of the above cobalt-carbon composition, 4 ml. of diethylaluminum chloride, 60 ml. of n-heptane were charged to a 300 ml. autoclave. The autoclave was maintained at 25–30° C. for 1.25 hours while 123 g. of ethylene was continuously charged to maintain a pressure of about 300 to 400 p.s.i. The conversion of ethylene was 98%. The selectivity to various oligomers and the percentage of straight-chain product are provided in Table IV.

TABLE IV

| | Selectivity, percent | Straight-chain product, percent |
|---|---|---|
| Oligomer: | | |
| $C_4$ | 92.7 | 62 |
| $C_6$ | 6.6 | 62 |
| $C_8$ | 0.6 | 37 |
| $C_{10}$ | 0.2 | 9 |

Example VII (A) A 4.2 g. sample of anhydrous nickel dichloride was stirred with 0.9 ml. of cyclohexene episulfide in 25 ml. of toluene at a temperature of about 110° C. for 7 hours. The sulfided nickel chloride was filtered, washed with n-heptane and dried under vacuum at a temperature of 25° C. Elemental analysis showed that the nickel dichloride was sulfided with 0.4% by weight of sulfur based on nickel chloride. A 1 g. sample of the sulfided nickel chloride was then contacted with 10 g. of commercial calcined alumina in 25 ml. of toluene at about 110° C. for 48 hours. The resulting supported nickel composition was separated from the tetrahydrofuran solution, washed with 1.0 g. of diethylaluminum chloride in 10 ml. of n-heptane. The resulting catalyst composition was placed in a stirred autoclave. To the autoclave was charged 15 g. of ethylene. The reaction conditions and results of this experiment are reported in Table V as Run A.

(B) A 700 ml. saturated tetrahydrofuran solution of anhydrous nickel chloride was contacted with 20 g. of alumina at a temperature of 25° C. for 4 days. The impregnated alumina was separated and dried under vacuum (2 mm. of Hg) at a temperature of 25° C. for 6 hours. Elemental analysis showed the alumina contained 1.5% by weight of nickel (as elemental Ni).

A 4 g. sample of the nickel-containing alumina composition was contacted with 0.16 g. of cyclohexene episulfide in 16 ml. of toluene at a temperature of 110° C. for 0.5 hour. The resulting sulfided alumina composition was then filtered, washed with heptane and dried under vacuum. Elemental analysis showed that the sulfided composition contained 0.3% by weight of sulfur (20% by weight based on Ni).

A 1 g. sample of the sulfided composition was contacted with 2 molar equivalents of diethylaluminum (based on Ni) in 2 ml. of heptane. The resulting catalyst composition solution and 30 additional ml. of heptane were placed in an autoclave. The autoclave was charged with 15 g. of ethylene. The reaction conditions and results of this experiment are reported in Table V as Run B.

(C) A 1 g. sample of the unsulfided nickel-containing alumina composition of Example VII (B) was contacted with 2 molar equivalents of diethylaluminum chloride in 2 ml. of n-heptane. The resulting composition was then contacted with ethylene by a procedure identical to Example VII (B). The results are provided in Table V as Run C.

TABLE V

| Run | A | B | C |
|---|---|---|---|
| Percent wt. S on NiCl$_2$ | 0.4 | 20 | 0 |
| Ethylene, g | 15 | 15 | 28 |
| Reaction time, hours | 2 | 3 | 1 |
| Pressure, p.s.i.g | 300-600 | 400-500 | 400-500 |
| Ethylene conversion, percent | 33 | 81 | 90 |
| Selectivity, percent wt.: | | | |
| C$_4$ | 61.7 | 60 | 85 |
| C$_6$ | 24.8 | 22 | 11 |
| C$_8$ | 8.5 | 8 | 4 |
| C$_{10}$ | 2.7 | 4 | Trace |
| C$_{12}$-C$_{20}$ | 2.3 | 6 | |
| Linearity, percent: | | | |
| C$_4$ | 100 | 100 | 100 |
| C$_6$ | 78 | 95 | 55 |
| C$_8$ | 69 | 90 | 12 |
| C$_{10}$ | 60 | 95 | |
| C$_{12}$-C$_{20}$ | 70 | 97 | |

I claim as my invention:

1. The process of oligomerizing ethylene by contacting ethylene, in liquid phase at a temperature of from 20° C. to about 200° C., with a catalyst composition produced by contacting (1) a sulfided cobalt or nickel salt supported on a refractory metal oxide containing a major proportion of alumina, wherein the cobalt salt contains from about 0.01% to about 5% by weight of sulfur, the nickel salt contains from about 0.01% to about 30% by weight of sulfur, and the alumina refractory oxide support contains from about 0.1% to about 5% by weight based on support of cobalt or nickel salt and (2) an alkyl aluminum compound represented by the formula $$R_3Al_2X_3 \text{ or } R_nAlX_{3-n}$$

wherein R is an alkyl of up to 8 carbon atoms, X is a halogen of atomic number from 17 to 35 inclusive, and $n$ is a whole number from 1 to 3 inclusive.

2. The process of claim 1 wherein the refractory metal oxide contains at least 90% by weight of alumina.

3. The process of claim 2 wherein the sulfided salt is a cobalt salt containing from about 0.1% by weight to about 3% by weight of sulfur.

4. The process of claim 3 wherein the cobalt salt is a cobalt halide wherein the halogen is a halogen of atomic number from 9 to 53, inclusive.

5. The process of claim 4 wherein the cobalt halide is cobaltous chloride.

6. The process of claim 2 wherein the sulfided salt is a nickel salt containing from about 0.1% by weight to about 20% by weight of sulfur.

7. The process of claim 6 wherein the nickel salt is a nickel halide wherein the halogen is a halogen of atomic number from 9 to 53, inclusive.

8. The process of claim 7 wherein the nickel halide is nickel chloride.

9. The process of claim 2 wherein the alkyl aluminum compound is represented by formula $R_3Al_2X_3$ wherein R is of up to 4 carbon atoms.

10. The process of claim 2 wherein the alkyl aluminum compound is represented by formula $R_nAlX_{3-n}$ wherein R is of up to 4 carbon atoms and $n$ is 2.

11. The process of claim 1 wherein the sulfur is incorporated on the cobalt or nickel salt by contacting the salt with elemental sulfur or a sulfur compound containing only the atoms of carbon, hydrogen and sulfur in an inert diluent.

References Cited

UNITED STATES PATENTS 3,096,385   6/1960   McConnell et al. __ 260—683.15
3,161,697   12/1964  Choufoer et al. ____ 260—683.15

PAUL M. COUGHLAN, JR., Primary Examiner

U.S. Cl. X.R.
252—429, 430